(12) United States Patent
Parr (10) Patent No.: US 9,538,882 B2
(45) Date of Patent: Jan. 10, 2017

(54) BAKEWARE WITH COVERED RIM

(71) Applicant: Becky Parr, Ann Arbor, MI (US)

(72) Inventor: Becky Parr, Ann Arbor, MI (US)

( * ) Notice: Subject to any disclaimer, the term of this patent is extended or adjusted under 35 U.S.C. 154(b) by 16 days.

(21) Appl. No.: 14/430,649

(22) PCT Filed: Mar. 11, 2013

(86) PCT No.: PCT/US2013/030168
§ 371 (c)(1),
(2) Date: Mar. 24, 2015

(87) PCT Pub. No.: WO2014/046725
PCT Pub. Date: Mar. 27, 2014

(65) Prior Publication Data
US 2015/0208860 A1     Jul. 30, 2015

Related U.S. Application Data

(60) Provisional application No. 61/704,898, filed on Sep. 24, 2012.

(51) Int. Cl.
| | |
|---|---|
| *A47J 36/04* | (2006.01) |
| *B65D 25/28* | (2006.01) |
| *A47J 37/01* | (2006.01) |
| *A47J 36/10* | (2006.01) |
| *A47J 41/00* | (2006.01) |
| *B65D 25/20* | (2006.01) |

(52) U.S. Cl.
CPC ............... *A47J 37/01* (2013.01); *A47J 36/04* (2013.01); *A47J 36/10* (2013.01); *A47J 41/0055* (2013.01); *B65D 25/205* (2013.01); *B65D 25/282* (2013.01); *B65D 2525/283* (2013.01)

(58) Field of Classification Search
CPC ............ A47J 36/36; A47J 36/02; A47J 36/04; A47J 45/066; A47J 45/08; A47J 45/10; A47J 37/01; A47J 36/10; A47J 41/0055; B65D 25/205; B65D 25/282; B65D 2525/283
USPC ...... 220/573.1, 753, 62.13, 62.14, 640, 642; D7/562, 570, 585, 588
See application file for complete search history.

(56) References Cited

U.S. PATENT DOCUMENTS

| 892,552 | A |   | 7/1908 | Rexer | |
|---|---|---|---|---|---|
| D78,661 | S | * | 5/1929 | Simmons | ...................... D7/585 |
| D129,827 | S | * | 10/1941 | Theobald | .................... D7/554.2 |
| D163,017 | S | * | 4/1951 | Blancheri | ...................... D7/588 |

(Continued)

*Primary Examiner* — J. Gregory Pickett
*Assistant Examiner* — Niki M Eloshway
(74) *Attorney, Agent, or Firm* — Fraser Clemens Martin & Miller LLC; Jacob M. Ward (57) ABSTRACT

A bakeware for preparing food includes a container for receiving ingredients and for separating a resulting food into predetermined portions during a cutting operation. The container has a bottom portion and at least one side wall extending outwardly along a periphery of the bottom portion. The bottom portion and the at least one side wall define an interior surface of the container. The at least one side wall terminates at an upper rim. A cover is disposed on the upper rim and is formed from a low thermal conductivity polymer. The cover includes a portion indicating indicia formed thereon, and each indicium of the portion indicating indicia has a cooperating indicium on an opposing side of the container. The cover includes a portion indicating indicia formed thereon, and each indicium of the portion indicating indicia has a cooperating indicium on an opposing side of the container.

19 Claims, 5 Drawing Sheets

(56) References Cited

U.S. PATENT DOCUMENTS

| | | | |
|---|---|---|---|
| 4,197,832 A * | 4/1980 | Thomas et al. ............ 126/390.1 |
| 4,648,300 A | 3/1987 | Hassenfelt, Jr. |
| 5,074,777 A | 12/1991 | Garner |
| 5,345,068 A | 9/1994 | Hatano et al. |
| D374,153 S * | 10/1996 | Moreno-Montemayor ... D7/566 |
| 5,584,414 A * | 12/1996 | Neubeck ....................... 220/753 |
| 6,009,786 A | 1/2000 | Hjelden |
| 6,745,660 B2 | 6/2004 | Caputo |
| 8,096,440 B2 | 1/2012 | Rhetat et al. |
| 8,176,842 B2 | 5/2012 | Baker |
| 8,887,943 B1 * | 11/2014 | Miller ......................... 220/573.1 |
| 8,925,759 B1 * | 1/2015 | Miller ........................... 220/642 |
| 2004/0112903 A1 * | 6/2004 | LoGiudice et al. ........ 220/573.1 |
| 2004/0154475 A1 | 8/2004 | Shaw et al. |
| 2009/0065307 A1 * | 3/2009 | Boyden et al. ................. 186/44 |
| 2009/0065509 A1 * | 3/2009 | Schuler ...................... 220/573.1 |
| 2009/0255420 A1 | 10/2009 | Freeman et al. |
| 2010/0136194 A1 | 6/2010 | Schutte |
| 2010/0326250 A1 * | 12/2010 | Parr .................................. 83/13 |
| 2011/0095031 A1 | 4/2011 | Welk et al. |
| 2011/0126719 A1 | 6/2011 | Valance |
| 2011/0283509 A1 * | 11/2011 | Miller ............................. 29/428 |
| 2011/0284553 A1 | 11/2011 | Roth et al. |
| 2012/0223086 A1 | 9/2012 | Mathieu |

* cited by examiner

BAKEWARE WITH COVERED RIM

CROSS-REFERENCE TO RELATED APPLICATION

This application claims priority to U.S. Provisional Application Ser. No. 61/704,898, filed Sep. 24, 2012, the entire disclosure of which is hereby incorporated herein by reference.

FIELD OF THE INVENTION

The present disclosure relates to bakeware, and more particularly to a baking pan having a silicone cover over a rim of the baking container.

BACKGROUND OF THE INVENTION

Many types of foods are prepared by mixing ingredients and placing the ingredients into a baking pan or container for heating in a cooking device such as a microwave or an oven, for example. Various baking pans are known in the prior art. Known baking pans have various shapes and configurations and are made from various materials such as metal, glass, and plastic. Some baking pans have indicia included on a surface of the baking pan such as a side wall, for example. Additionally, it is known to include a handle or rim on a baking pan such that a user is able to grasp the baking pan more easily. Baking pans are also known to have lids and corresponding cutting tools.

Baking pans are typically extremely hot when they are removed from an oven. Often times, additional equipment is required for removal of the baking pans. For example, oven mittens or other external covers may be used. However, oven mittens and the like are usually awkward and bulky making it difficult to grasp a baking pan and more likely that the user will tilt or drop the baking pan. Additionally, oven mittens and covers are not sanitary and often not effectively heat resistant. Most importantly, oven mittens and the like do not effectively prevent burns to the user.

It is desirable to have a baking pan that is easy to remove from an oven, and which militates against a user burning the user's fingers when handling the hot baking pan.

SUMMARY OF THE INVENTION

Consonant with the instant disclosure, a baking pan that is easy to remove from an oven and that militates against a user burning the user's fingers when handling the hot baking pan, has surprisingly been discovered.

In one embodiment of the disclosure, a container for receiving ingredients and for separating a resulting food into predetermined portions during a cutting operation is disclosed. The container has a bottom portion and at least one side wall extending outwardly along a periphery of the bottom portion. The bottom portion and the at least one side wall define an interior surface of the container, and the at least one side wall terminates at an upper rim. A cover is disposed on the upper rim, and the cover is thermally insulating.

In another embodiment of the disclosure, a container for receiving ingredients and for separating a resulting food into predetermined portions during a cutting operation includes a container having a bottom portion and at least one side wall extending outwardly along a periphery of the bottom portion. The bottom portion and the at least one side wall define an interior surface of the container, and the at least one side wall terminates at an upper rim. A cover is disposed on the upper rim. The cover is formed from a heat-resistant polymer and includes a portion indicating indicia formed thereon. Each indicium of the portion indicating indicia have a cooperating indicium on an opposing side of the container.

In yet another embodiment of the disclosure, a container for receiving ingredients and for separating a resulting food into predetermined portions during a cutting operation is described. The container includes a bottom portion and at least one side wall extending outwardly along a periphery of the bottom portion. The bottom portion and the at least one side wall define an interior surface of the container, and the at least one side wall terminates at an upper rim. A cover is disposed on the upper rim. The cover is formed from a heat-resistant polymer and includes a portion indicating indicia formed thereon. The portion indicating indicia includes alternating major indicia and minor indicia. Each indicium of the portion indicating indicia is formed as a raised line on the cover and has a cooperating indicium on an opposing side of the container. At least one handle extends outwardly from one of the upper rim and the side wall, and the cover is one of removably and permanently affixed to the handle.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

The following detailed description and appended drawings describe and illustrate various exemplary embodiments of the invention. The description and drawings serve to enable one skilled in the art to make and use the invention, and are not intended to limit the present disclosure, application, or uses.

Referring to FIGS. 1-7 there is illustrated a baking pan, generally identified by reference numeral 10, for use in preparing food. The baking pan 10 includes a bottom portion 12, at least one peripheral side wall 14, a rim 16, and a cover 18. The baking pan 10 may be used to bake various food items such as cakes, brownies, and casseroles, for example. Additionally, the baking pan 10 may be used with any cooking device such as a microwave, oven, stove top, or grill, for example.

Figure 1:
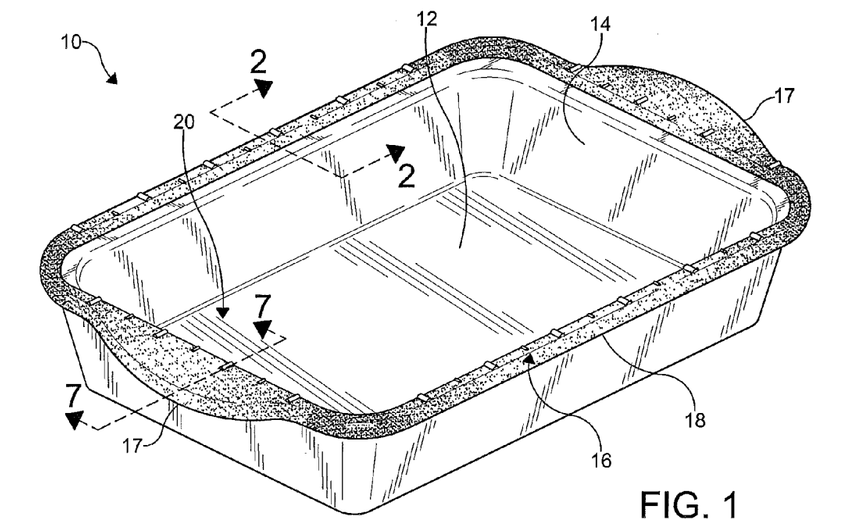
FIG. 1 shows a perspective view of a baking pan according to an embodiment of the disclosure.

As shown in FIG. 1, the at least one peripheral side wall 14 extends upwardly from a perimeter of the bottom portion 12 of the baking pan 10. In certain embodiments, the bottom portion 12 and the at least one peripheral side wall 14 are perpendicular to one another. In an alternate embodiment of the invention, the at least one peripheral side wall 14 may extend upwardly away from the bottom portion 12 at an obtuse angle relative to the bottom portion 12 of the baking pan 10.

FIG. 1 illustrates the bottom portion 12 and the at least one peripheral side wall 14 both having flat, smooth surfaces. However, the bottom portion 12 and the at least one peripheral side wall 14 may have uneven, rough, or bumpy surfaces.

In certain embodiments, the bottom portion 12 and the at least one peripheral side wall 14 are fainted from a sheet metal. It should be appreciated that the baking pan 10 may be formed from other materials such as glass or plastic, for example, which may be suitable for baking. The materials forming the bottom portion 12 and the at least one peripheral side wall 14 may be the same or different materials. Additionally, the bottom portion 12 and the at least one peripheral side wall 14 may be separate pieces coupled together using a connecting means, or may be integral with one another, as desired.

Figure 5:
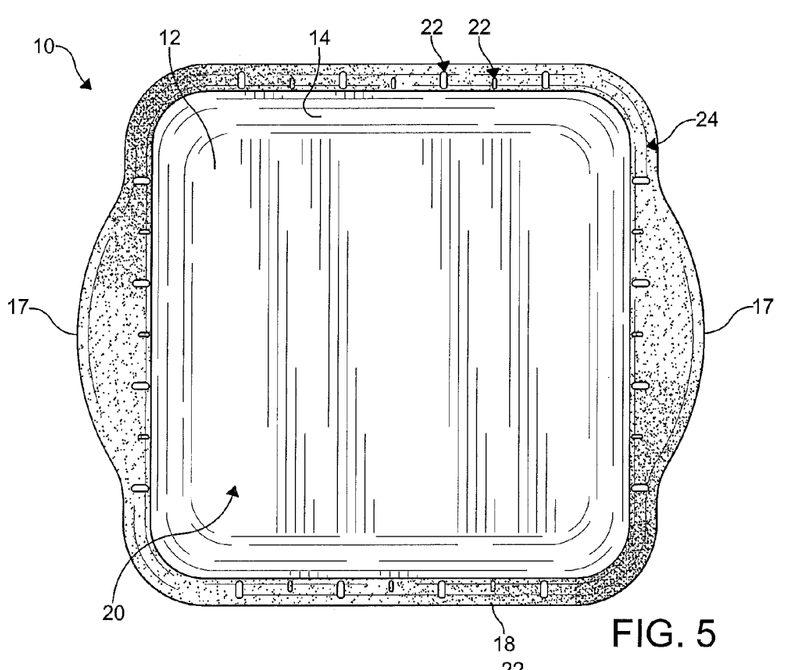
FIG. 5 shows a top plan view of a square baking pan according to another embodiment of the disclosure.
Figure 6:
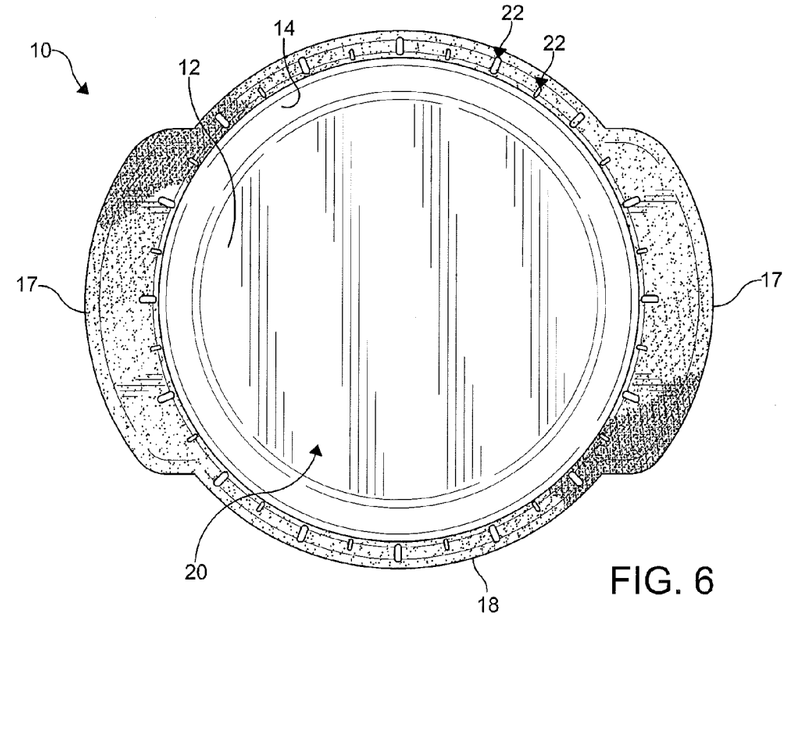
FIG. 6 shows a top plan view of a circular baking pan according to yet another embodiment of the disclosure.

As shown in FIGS. 1, 5, and 6, the bottom portion 12 and the at least one peripheral side wall 14 may be any desirable size and shape capable of housing and cooking the food such as square, rectangular, circular, or irregular, as nonlimiting examples.

An inner surface 20 of one or both of the bottom portion 12 and the at least one peripheral side wall 14 may further include a non-stick coating such as a polytetrafluoroethylene coating, commercially available under the trademark Teflon®.

It should be understood that, although a pan is illustrated in FIGS. 1-7, a pot, plate, or tray may also be formed in accordance with the disclosure. Additionally, in certain embodiments such as a cookie sheet or a pizza tray, for example, it should be appreciated that the pan may not include the at least one peripheral side wall 14.

In the embodiments shown, the rim 16 extends outwardly away from a perimeter of the at least one peripheral side wall 14. In exemplary embodiments, the rim 16 is integral with the peripheral side wall 14. The rim 16 may extend only partially around the perimeter of the at least one peripheral side wall 14. The rim 16 and the at least one peripheral side wall 14 are perpendicular to one another in certain embodiments of the disclosure, and the rim 16 and the bottom portion 12 are parallel to one another. In alternate embodiments of the invention, the rim 16 may extend outwardly from the at least one peripheral side wall 14 at an obtuse or acute angle relative to the peripheral side wall 14.

Figure 2A:
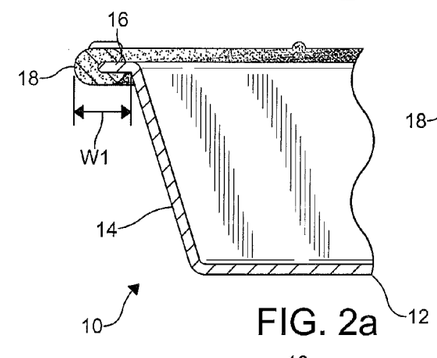
FIG. 2a shows a cross-sectional side elevational view of the baking pan taken along section line 2-2 of FIG. 1, according to one embodiment of the disclosure.

FIGS. 2a, 2b, 2c, and 8 illustrate the rim 16 having a flat, smooth surface. However, the rim 16 may have an uneven, textured, rough, or bumpy surface 100 (shown in FIG. 8). The rim 16 may be formed from a sheet metal or may be formed from other suitable materials such as glass or plastic, for example, having desirable thermal properties. A width W1 of the rim 16, as shown in FIG. 2a, may be wide enough so that the user may grasp and hold on to the rim 16.

In alternative embodiments, the rim 16 may be formed from a separate piece that is either permanently affixed or removably coupled to the at least one peripheral side wall 14. The material forming the rim 16 may be the same as or different from the material forming the bottom portion 12 and the at least one peripheral side wall 14.

Figure 7:
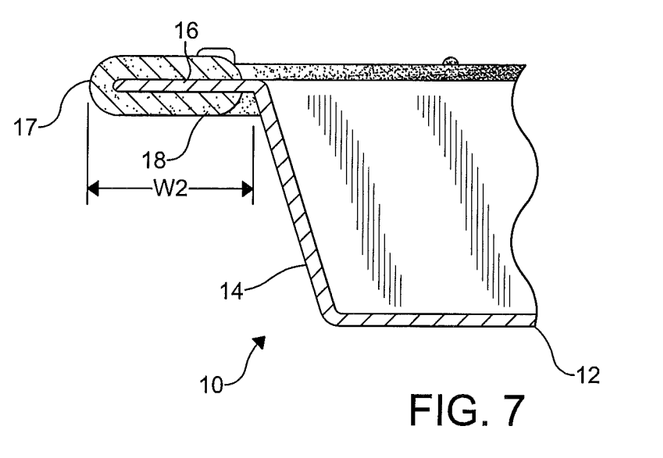
FIG. 7 shows a cross-sectional side elevational view of a handle of the baking pan taken along section line 7-7 of FIG. 1.
Figure 8:
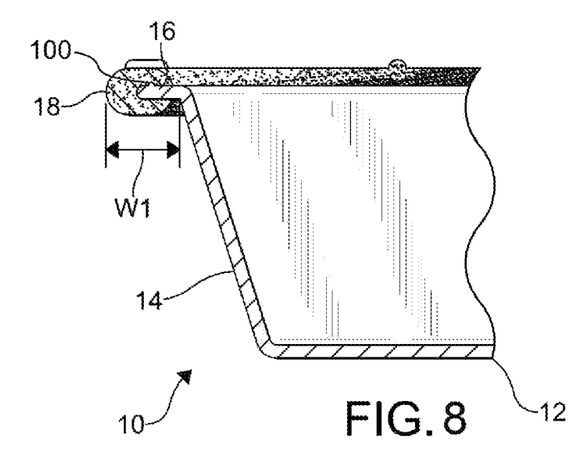
FIG. 8 shows a cross-sectional side elevational view of the baking pan taken along section line 2-2 in FIG. 1, according to a further embodiment of the disclosure including a bumpy surface.

The pan 10 may also have one or more handles 10 that facilitate a handling of the pan 10 by the user. In certain embodiments, the one or more handles 17 may be integrally formed on the rim 16. A width W2 of each handle 17 may be sufficient to permit the user to grasp and hold onto the handle 17, as shown in FIG. 7. For example, the width W2 of each handle 17 may greater than the width W1 of the rim 16 (see FIGS. 2a and 7). In a particular example, the width W2 of the handle 17 may be at least twice as long as the width W1 of the rim 16. Another width W2 of the handle 17 may be selected by a skilled artisan, as desired.

It should be appreciated that the width of each handle 17 may be uniform along a length of the handle 17, or may vary along a length of the handle, for example, as shown in FIGS. 1 and 7. As shown in FIG. 1, the width of the handle 17 may gradually increase from a first end of the handle 17 to a center of the handle 17, and then gradually decrease from the center of the handle 17 to a second end of the handle 17 along the length of the handle 17. Other shapes for the handle 17 may also be used within the scope of the disclosure.

Additionally, a thickness of the handle 17 may be the same as, or different from, a thickness of the rim 16, the at least one peripheral side wall 14, and/or the bottom portion 12. The thickness of the handle may also vary throughout a length, a depth, or the width of the handle, as desired.

Where the baking pan 10 includes more than one handle 17, the handles 17 may be identical to one another, or different from one another, as desired. Additionally, the handles 17 may be positioned opposite one another, or adjacent one another, as desired. Alternatively, there may only be one handle 17.

Further embodiments may include handles 17 on each of the at least one peripheral side walls 14. The one or more handles 17 may alternatively be grooves, apertures, or other gripping elements disposed on the at least one peripheral side wall 14 or the rim 16. Each handle 17 may be a separate element extending outwardly from the rim 16 and/or the at least one peripheral side wall 14, or may be integral with the rim 16 or the at least one side wall 14.

The cover 18 is disposed around the rim 16 and/or the one or more handles 17 in certain embodiments of the disclosure. The cover 18 may envelope one or more of a top surface, a bottom surface, and a side surface of the rim 16 and/or the one or more handles 17. In certain embodiments, the cover 18 may also coat a portion of the at least one peripheral side wall 14 or the bottom portion 12.

A heat resistant material such as cotton, wool, rubber, silicone, or other heat-resistant polymers, for example, forms the cover 18. Desirably, the material forming the cover 18 has a lower thermal conductivity relative to a body of the pan 10, and minimizes an opportunity for the user to be burned while the pan 10 is hot. Although silicone is contemplated as one particular type of material suitable for the cover 18, it should be appreciated that other suitable materials may also be used within the scope of the disclosure.

Figure 2B:
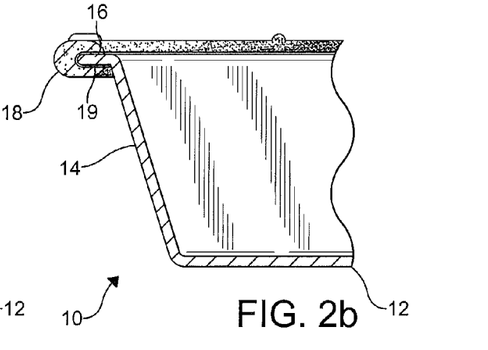
FIG. 2b shows a cross-sectional side elevational view of the baking pan taken along section line 2-2 of FIG. 1, according to another embodiment of the disclosure including an adhesive.
Figure 2C:
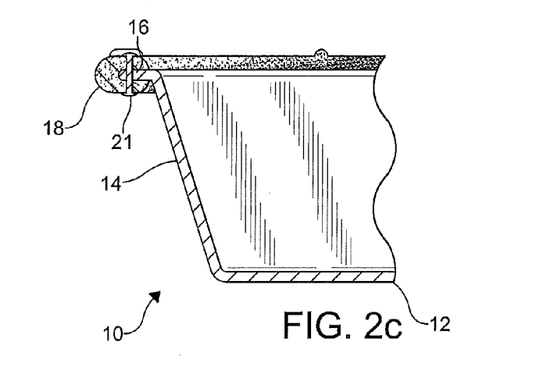
FIG. 2c shows a cross-sectional side elevational view of the baking pan taken along section line 2-2 of FIG. 1, according to yet another embodiment of the disclosure including a fastener.

As shown in FIGS. 2a-2c, the cover 18 may be permanently or removably connected to the rim 16 and/or the handles 17 by one or both of a mechanical fastener 21 and an adhesive 19. Mechanical fasteners 21 such as rivets, screws, or press fasteners, for example, may be used (see FIG. 2c). In other embodiments, the mechanical fasteners 21 may be in the form of surface projections which serve to hold the cover 18 in place.

Adhesives 19 such as glue, rubber, or other natural or synthetic adhesives that do not degrade and can withstand repeated exposure to temperatures associated with the baking of baked goods may also be used (see FIG. 2b). Where a polymer such as silicone is used as the material forming the cover 18, it should be appreciated that the polymer may be compounded with bonding ingredients such as silane and the like that chemically bond or increase an affinity of the polymer for the material forming the pan 10.

In another example, the cover 18 may be made from a flexible, stretchable material capable of expanding during installation and returning to a form-fitting, secure shape once disposed on the rim 16 and/or the one or more handles 17 of the baking pan 10.

In further example, the cover 18 cooperates with the rim 16 and/or the handles 17 with a tongue and groove construction (not shown) to secure the cover 18 to the pan 10. The cover 18 may have one of a tongue and a groove that cooperates with a corresponding one of a tongue and a groove on the rim 16 and/or handles 17. The tongue may be provided by a rib on the rim 16 that is disposed around a periphery of the pan 10 and cooperates with a corresponding groove in the cover 18, for example. Likewise, the tongue may be provided by a rib on the inner surface of the cover 18 that cooperates with a corresponding groove in the rim 16 and/or the handles 17. One of ordinary skill in the art should understand that the tongue in groove configuration may further be employed together with the adhesive 19, such as a silicone adhesive, as desired.

In certain embodiments, the cover 18 may be transparent. In illustrative embodiments, the cover 18 may be provided with one or more colors. For example, one or more colorants may be added to the material forming the cover 18 in order to display one or more colors in the cover 18. Alternatively, a coating may be added to the cover 18 to display the one or more colors on the cover 18. Additionally, the cover 18 may include a design or a pattern on it, in order to facilitate a visual appeal of the cover 18.

A thickness of the material forming the cover 18 may be uniform throughout the cover 18, or may vary, as desired. As shown in FIG. 7, the thickness of the cover 18 may be greater on the one or more handles 17 than on the rim 16. It should be appreciated that this may further minimize an opportunity for a user being burned when gripping the handles 17.

The thickness of the cover 18 along the one or more handles 17 may also vary. For example, the thickness of the cover 18 on the handles 17 may be thicker toward a perimeter of each handle 17, and thinner toward an area of each handle 17 adjacent the peripheral side wall 14. In other embodiments, the thickness may taper off as the cover 18 approaches the peripheral side wall 14. Furthermore, the cover 18 on the handle 17 may have finger grooves to facilitate the gripping of the handle 17 by the user.

In certain embodiments, a variable thickness of the cover 18 may provide for variable textures, such as groves and bumps, for example. The cover 18 may have a smooth, rough, or textured surface, as desired. Additionally, a handle, groove, aperture, or other gripping element corresponding with or separate from the at least one handle 17 may be included as an extension of or an integral part of the cover 18.

Advantageously, the cover 18 may include indicia 22 for assisting the user in cutting uniform portions of the food. The indicia 22 may be raised lines on and/or grooves in the cover 18, marks on or additional components extended outwardly from an external surface 24 of the cover 18, marks or additional components included in an inner portion of the cover 18, numerical designations, or any other appropriate indicia 22. Alternatively, the indicia 22 may be included or formed on the rim 16 where the material forming the cover 18 is clear. The indicia 22 may also be included on the at least one peripheral side wall 14 and/or the bottom surface 12.

Figure 3:
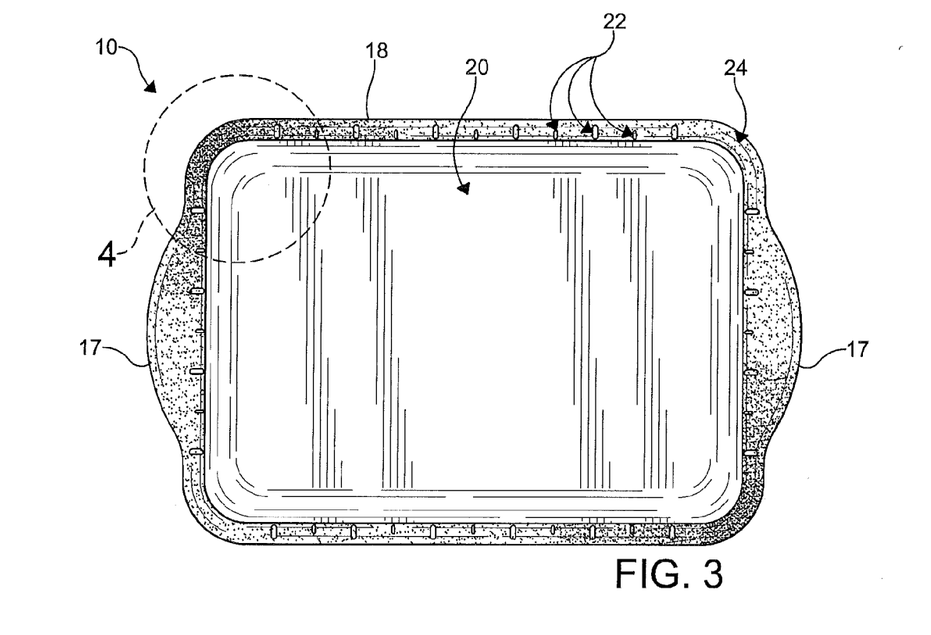
FIG. 3 shows a top plan view of the baking pan illustrated in FIG. 1.
Figure 4:
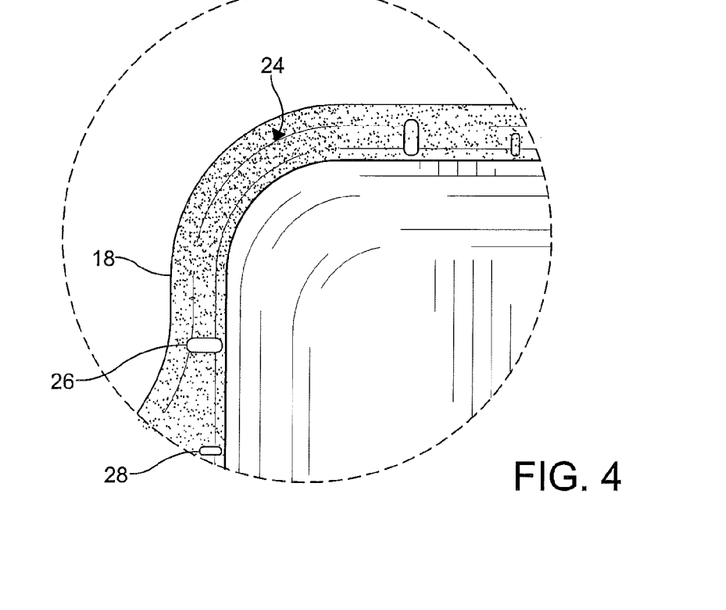
FIG. 4 shows an enlarged, fragmented top plan view of a cover around a rim of the baking pan of FIG. 1.

The indicia 22 may include both major marks 26 and minor marks 28 such as those found on a ruler, for example, and as shown in FIG. 4. In certain embodiments, each indicium 22 has a corresponding indicium 22 on an opposing side of the baking pan 10, as shown in FIG. 3. The major marks 26 and minor marks 28 may be arranged in an alternating pattern or any other pattern. The indicia 22 may be clear, one or more colors, or may have a pattern or design formed on them, as desired.

In operation, the user mixes the ingredients and places the ingredients into the baking pan 10. The bottom portion 12 and the at least one peripheral side wall 14 contain and house the ingredients in a desired configuration, i.e., the shape of the baking pan 10. The baking pan 10 is gripped by the user by either the rim 16 or the one or more handles 17 and placed in the oven, microwave, or other cooking device. The baking pan 10 and the ingredients are then heated by the cooking device until the ingredients are sufficiently cooked.

When the baking pan 10 is ready for removal from the cooking device, the user grasps the rim 16 or the one or more handles 17 of the baking pan 10 that are enveloped by the cover 18, and removes the baking pan 10 from cooking device. The surface of the cover 18 may be textured or rough in order to prevent the baking pan 10 from slipping out of the user's hands. Due to a difference in thermal conductivity between the cover 18 and the body of the pan 10, the cover 18 provides a cool surface that allows the user to grasp the baking pan 10 without receiving a burn.

Once the baking pan 10 is removed from the cooking device, the user may separate the food contained in the baking pan 10 into uniform or non-uniform portions using the indicia 22 disposed along the cover 18, the rim 16, the at least one peripheral side wall 14, and/or the bottom portion 12. The major marks 26 and/or the minor marks 28 may be used to measure and separate the food into the desired portions and the corresponding indicia 22 disposed on opposing sides of the baking pan 10 allow a user to more accurately separate the uniform portions.

Means for cutting or separating the food (not shown) may also be included with the baking pan 10. The user may grasp the cool surface of the cover 1 with one hand in order to hold the baking pan 10 steady if separating the food prior to the baking pan 10 cooling, or the user may wait for the baking pan 10 and the food to cool before separating the food into portions. Where the baking pan 10 includes a colored cover 18, the color of the cover 18 may be indicative of the temperature of the baking pan 10. For example, the cover 18 may be red when the baking pan 10 is hot and may be blue when the baking pan 10 is cool. Other indications of a temperature of the baking pan 10 may also be included.

There are numerous advantages of the above described baking pan 10. First, the user is not injured when handling the baking pan 10 because the heat-resistant cover 18 surrounding the rim 16 protects the user from burns. Second, additional potentially contaminating and inconvenient equipment, such as oven gloves, pads, or additional trays, for example, are not required to handle the baking pan 10. The cover 18 also allows the user to more easily grip and hold onto the baking pan 10. Third, the indicia 22 included on the cover 18, the rim 16, the at least one peripheral side wall 14, and/or the bottom portion 12 of the baking pan 10 allow the user to separate the food into uniform portions, as desired.

While certain representative embodiments and details have been shown for purposes of illustrating the invention, it will be apparent to those skilled in the art that various changes may be made without departing from the scope of the disclosure, which is further described in the following appended claims.

What is claimed is:

1. A bakeware for preparing food, comprising:
   a container for receiving ingredients and for separating a resulting food into predetermined portions during a cutting operation, the container having a bottom portion and at least one side wall extending outwardly along a periphery of the bottom portion, the bottom portion and the at least one side wall defining an interior surface of the container, and the at least one side wall terminating at an upper rim, wherein the upper rim has a plurality of bumps formed thereon, the container having at least one handle extending outwardly from the upper rim and having a width greater than a width of the upper rim; and
   a cover disposed on the upper rim and the handle, wherein the cover is thermally insulating and has a portion indicating indicia formed thereon, the bumps of the upper rim disposed beneath the cover,
   wherein the cover further has a top portion and a bottom portion that sandwich therebetween both the upper rim and the handle, the top portion abutting a top side of the upper rim and the handle along the width of the upper rim and the width of the handle, and the bottom portion abutting a bottom side of the upper rim and the handle along the width of the upper rim and the width of the handle, the top portion have an edge that is spaced apart from the interior surface of the container, and the bottom portion having an edge that is disposed adjacent to an outer surface of the at least one sidewall, at a same distance relative to the outer surface around an entirety of the container.

2. The bakeware of claim 1, wherein the cover is formed from a polymer having a low thermal conductivity.

3. The bakeware of claim 2, wherein the polymer is silicone.

4. The bakeware of claim 1, wherein the cover is permanently affixed to the upper rim with at least one of a mechanical fastener and an adhesive.

5. The bakeware of claim 1, wherein the cover is removably attached to the upper rim.

6. The bakeware of claim 1, wherein the portion indicating indicia formed on the cover includes alternating major indicia and minor indicia.

7. The bakeware of claim 6, wherein a length of each of the major indicia is greater than a length of each of the minor indicia.

8. The bakeware of claim 1, wherein each indicium is at least one of a raised line formed on the cover, an indentation formed in the cover, a separate component on an outer surface of the cover, and a separate component in an inner portion of the cover.

9. The bakeware of claim 8, wherein each indicium is a raised line formed on the cover, and wherein the raised line is a semi-cylindrical shape having a pair of opposing semi-hemispherical ends.

10. The bakeware of claim 1, wherein the cover is one of formed from a colored polymer and covered by a colored coating.

11. The bakeware of claim 1, wherein the cover is one of removably affixed and permanently affixed to the handle.

12. A bakeware for preparing food, comprising:
    a container for receiving ingredients and for separating a resulting food into predetermined portions during a cutting operation, the container having a bottom portion and at least one side wall extending outwardly along a periphery of the bottom portion, the bottom portion and the at least one side wall defining an interior surface of the container, and the at least one side wall terminating at an upper rim, wherein the upper rim has a plurality of bumps formed thereon, the container having at least one handle extending outwardly from the upper rim and having a width greater than a width of the upper rim; and
    a cover disposed on the upper rim and the handle, wherein the cover is formed from a low thermal conductivity polymer and wherein the cover includes a portion indicating indicia formed thereon, each indicium of the portion indicating indicia having a cooperating indicium on an opposing side of the container, the bumps of the upper rim disposed beneath the cover,
    wherein the cover further has a top portion and a bottom portion that sandwich therebetween both the upper rim and the handle, the top portion abutting a top side of the upper rim and the handle along the width of the upper rim and the width of the handle, and the bottom portion abutting a bottom side of the upper rim and the handle along the width of the upper rim and the width of the handle, the top portion have an edge that is spaced apart from the interior surface of the container, and the bottom portion having an edge that is disposed adjacent to an outer surface of the at least one sidewall, at a same distance relative to the outer surface around an entirety of the container.

13. The bakeware of claim 12, wherein the cover is formed from silicone.

14. The bakeware of claim 12, wherein the cover is permanently affixed to the rim with at least one of a mechanical fastener and an adhesive.

15. The bakeware of claim 12, wherein the cover is one of removably affixed and permanently affixed to the handle.

16. The bakeware of claim 12, wherein the portion indicating indicia formed on the cover includes alternating major indicia and minor indicia.

17. The bakeware of claim 12, wherein each indicium is at least one of a raised line formed on the cover, an indentation formed in the cover, a separate component on an outer surface of the cover, and a separate component in an inner portion of the cover.

18. A bakeware for preparing food, comprising:
    a container for receiving ingredients and for separating a resulting food into predetermined portions during a cutting operation, the container having a bottom portion and at least one side wall extending outwardly along a periphery of the bottom portion, the bottom portion and the at least one side wall defining an interior surface of the container, and the at least one side wall terminating at an upper rim, wherein the upper rim has a plurality of bumps formed thereon;

a cover disposed on the upper rim, wherein the cover is formed from silicone and wherein the cover includes a portion indicating indicia formed thereon, the portion indicating indicia including alternating major indicia and minor indicia, each indicium of the portion indicating indicia formed as a raised line on the cover and having a cooperating indicium on an opposing side of the container, the bumps of the upper rim disposed beneath the cover; and at least one handle extending outwardly from one of the upper rim, the handle having a width greater than a width of the upper rim, wherein the cover is one of removably affixed and permanently affixed to the handle, wherein the cover further has a top portion and a bottom portion that sandwich therebetween both the upper rim and the handle, the top portion abutting a top side of the upper rim and the handle along the width of the upper rim and the width of the handle, and the bottom portion abutting a bottom side of the upper rim and the handle along the width of the upper rim and the width of the handle, the top portion have an edge that is spaced apart from the interior surface of the container, and the bottom portion having an edge that is disposed adjacent to an outer surface of the at least one sidewall, at a same distance relative to the outer surface around an entirety of the container.

19. The bakeware of claim 18, wherein a length of each of the major indicia is greater than a length of each of the minor indicia.

\* \* \* \* \*